US008311703B2

(12) United States Patent
Fujiwara et al.

(10) Patent No.: US 8,311,703 B2
(45) Date of Patent: Nov. 13, 2012

(54) CONTROL SYSTEM

(75) Inventors: Hiroyuki Fujiwara, Iida (JP); Yasutaka Katayanagi, Tochigi (JP)

(73) Assignee: OMRON Corporation, Kyoto (JP)

( * ) Notice: Subject to any disclaimer, the term of this patent is extended or adjusted under 35 U.S.C. 154(b) by 398 days.

(21) Appl. No.: 12/611,425

(22) Filed: Nov. 3, 2009

(65) Prior Publication Data

US 2010/0114429 A1 May 6, 2010

(30) Foreign Application Priority Data

Nov. 5, 2008 (JP) ................................ 2008-284678

(51) Int. Cl.
*G06F 7/00* (2006.01)

(52) U.S. Cl. ........... 701/36; 236/1 G; 236/93 R; 475/81; 475/82; 477/5

(58) Field of Classification Search .................... 701/36; 236/1 G, 93 R; 475/81–82; 477/5
See application file for complete search history.

(56) References Cited

U.S. PATENT DOCUMENTS 6,861,973 B2 * 3/2005 Kishida ......................... 342/109
6,879,892 B2 * 4/2005 Matsumoto ..................... 701/36

FOREIGN PATENT DOCUMENTS

JP 11-219238 A 8/1999
JP 2001-158310 A 6/2001

* cited by examiner

*Primary Examiner* — Thomas Black
*Assistant Examiner* — Luke Huynh
(74) *Attorney, Agent, or Firm* — Osha Liang LLP

(57) ABSTRACT

A control system has a startup start device that generates and outputs a startup start signal that starts a startup of a vehicle based on an operation of starting up the vehicle, a power supply device that supplies power to each unit of the vehicle, a central control unit that generates and outputs to a motor device for driving the vehicle, a startup command signal that starts up the motor device based on the startup start signal, a startup control unit that performs a startup control of the motor device based on the startup command signal, a drive control unit that performs a drive control of a peripheral device configuring the vehicle, a storage unit that stores first data containing initial information of the peripheral device or setting information set in advance, and a data storage control unit that performs the startup control of the motor device by the startup control unit after storing second data indicating, when the operation of starting up the vehicle is performed, a state of the peripheral device at the time of the operation in a predetermined storage area in the storage unit.

20 Claims, 4 Drawing Sheets

CONTROL SYSTEM

BACKGROUND OF THE INVENTION

1. Technical Field

The present invention relates to a control system for storing data indicating a state of each unit of a vehicle, and controlling each unit of the vehicle based on the relevant data.

2. Related Art

In recent years, a demand for a control system that verifies a state of each unit of the vehicle at the time of engine startup based on initial information of each unit of the vehicle and/or setting information and the like set in advance by a passenger and the like and controls each unit of the vehicle based on the verification result is increasing with higher function of the vehicle.

In the control system, the ECU (Electronic Control Unit) for controlling a seat stores data containing initial information including a reference position of the seat, a reference angle of a backrest and the like, and setting information including a seat position, a backrest angle, and the like for every seat set in advance by the passenger and the like in a storage unit including a non-volatile storage medium such as an EEPROM (Electronically Erasable and Programmable Read Only Memory). The data indicating the state of the seat (seat position, backrest angle, and the like) at the time of the engine startup is stored in a temporary storage unit including a volatile storage medium such as a RAM (Random Access Memory).

If there is a difference between the data stored in the storage unit and the data stored in the temporary storage unit, that is, if the seat position or the backrest angle at the time of the engine startup and the seat position or the backrest angle set in advance differ, the ECU moves the seat position and inclines the backrest to the position and the angle set in advance based on the data stored in the storage unit. The above described cases where the operation of moving the seat and inclining the backrest is performed include a case performed by the ECU when recognizing that the operation switch has been operated by the passenger, and a case automatically performed by the ECU after the engine startup and the like.

Similarly, the ECU that controls the window stores data containing the initial information including a fully-opened and fully-closed position of the window, and the like in a storage unit including a non-volatile storage medium such as the EEPROM, and stores the data indicating the state of the window (position in up and down direction (vertical direction) of the window, and the like) at the time of the engine startup in the temporary storage unit including a volatile storage medium such as the RAM.

When the passenger performs the operation of fully opening or fully closing the window, the ECU moves the window to the fully-opened or fully-closed position based on the data stored in the storage unit and the data stored in the temporary storage unit.

As described above, the data containing the initial information, the setting information and the like of each unit of the vehicle are held in a non-volatile storage unit that normally does not require power to hold the data in terms of the importance of the data. The data indicating the state of each unit of the vehicle at the time of the engine startup is held in the volatile storage unit that requires power at all times to hold the data in terms of a capacity of the data, a cost, and the like.

The engine normally includes a startup motor for engine startup, and a crankshaft for converting the power (e.g., power generated by reciprocating motion of piston) generated after startup to a rotation force, where the startup motor starts up at the time of the engine startup so that the crankshaft starts to rotate. The operation at the time of the engine startup is hereinafter referred to as "cranking".

However, since a supply voltage from a power supply device (battery) to the startup motor rises by the cranking at the time of the engine startup, the supply voltage from the power supply device to the ECU for controlling the seat, the window, and the like sometimes temporarily (time in unit of 1/1000 second) lowers to a voltage value lower than a minimum voltage required for the operation of the ECU. Thus, the ECU supplied with power from the power supply device becomes inoperable due to the lowering in voltage, whereby the power supply from the ECU to the temporary storage unit stops and the temporary storage unit cannot hold the stored data. That is, the data stored in the temporary storage unit disappears.

Therefore, if the data indicating the state of each unit of the vehicle at the time of the engine startup is not normally obtained (disappeared), the ECU cannot control each unit of the vehicle based on the data stored in the non-volatile storage unit and the data stored in the volatile storage unit. Thus, the seat cannot be accurately moved to a predetermined position (position set in advance by passenger and the like), and that the window cannot be stopped accurately at the fully-opened or fully-closed position when the operation of fully opening or fully closing the window is performed.

Therefore, in order to prevent disappearing of data indicating the state of each unit of the vehicle at the time of the engine startup in such a control system, in Japanese Unexamined Patent Publication No. 11-219238, if the power supply voltage of the integrated circuit is greater than or equal to a storage holding voltage of the volatile storage unit, this is detected and an instructing voltage accumulated in an accumulator is held at a predetermined first state, whereas if the power supply voltage of the integrated circuit becomes lower than the storage holding voltage of the volatile storage unit by the cranking at the time of the engine startup, this is detected and the instructing voltage accumulated in the accumulator is discharged to a predetermined second state to hold the data stored in the volatile storage unit.

In Japanese Unexamined Patent Publication No. 2001-158310, in a power management system in which a main limiting output voltage is generated according to a main input voltage and the power is supplied to a main processor board by a main voltage regulator, and a secondary limiting output voltage is generated according to a secondary input voltage and the power is supplied to the volatile RAM at least during the startup of the engine by a secondary voltage regulator, the main voltage regulator supplies the main limiting output voltage when the main input voltage is within a main voltage range and the secondary voltage regulator supplies the secondary limiting output voltage when the secondary input voltage is within a secondary voltage range including a voltage value lower than the main voltage width, and when the main processor board detects the signal related to cranking at the time of the engine startup, a predetermined device controlled by the main processor board is shut down, and the most recent state of the predetermined device is stored in the volatile RAM.

SUMMARY

As described in Japanese Unexamined Patent Publication No. 11-219238, in a method of detecting the lowering to smaller than the storage holding voltage of the volatile storage unit, and discharging the instructing voltage accumulated in the accumulator to a predetermined second state, discharging may not be carried out as the lowering in voltage occurs within a very short time of 1/1000 second unit, as is well known, and the storage holding voltage of the volatile storage unit may not be maintained as detection of lowering to smaller than the storage holding voltage is made and then discharging is carried out. Furthermore, the data stored in the volatile storage unit may not be held as means for writing the data stored in the volatile storage unit to a non-volatile storage unit that does not require power to hold the data is not provided. In other words, the data may disappear.

As in Japanese Unexamined Patent Publication No. 2001-158310, in a method of shutting down a predetermined device controlled by the main processor board and storing the most recent state of the predetermined device in the volatile RAM when the main processor board detects the signal related to cranking at the time of the engine startup, the most recent state of the predetermined device needs to be stored in the volatile RAM during the period from when the signal related to cranking is generated until the start of cranking of the engine, that is, in a very short period of time which is said to be a time of 1/1000 second unit, and thus the storing process may not be correctly terminated. In other words, the data may be stored in an insufficient state.

Therefore, in the methods of Japanese Unexamined Patent Publication Nos. 11-219238 and 2001-158310, the data indicating the state of each unit of the vehicle at the time of the engine startup may not be reliably held, or may not be correctly stored in another storage medium. In such a case, the ECU cannot accurately control each unit of the vehicle, for example, the ECU cannot accurately move the seat to the position set in advance by the passenger or the like when the operation related to position change of the seat is performed, or cannot stop the window at the fully-opened or fully-closed position when the operation related to fully opening or fully closing the window is performed. The passenger thus may feel inconvenient, or part deterioration and failure due to excessive control and the like on each unit of the vehicle may occur.

One or more embodiments of the present invention provides a control system capable of reliably holding data indicating the state of each unit of the vehicle at the time of the engine startup.

In accordance with one aspect of the present invention, a control system includes: a startup start device for generating and outputting a startup start signal for starting a startup of a vehicle based on an operation of starting up the vehicle; a power supply device for supplying power to each unit of the vehicle; a central control unit for generating and outputting to a motor device for driving the vehicle, a startup command signal for starting up the motor device based on the startup start signal; a startup control unit for performing a startup control of the motor device based on the startup command signal; a drive control unit for performing a drive control of a peripheral device configuring the vehicle; and a storage unit for storing first data containing initial information of the peripheral device and/or setting information set in advance; and the control system further includes: a data storage control unit for performing the startup control of the motor device by the startup control unit after storing second data indicating, when the operation of starting up the vehicle is performed, a state of the peripheral device at the time of the operation in a predetermined storage area in the storage unit.

With such a configuration, when the operation of starting up the vehicle is performed, the second data indicating the state of the peripheral device at the time of the operation can be stored in a predetermined storage area in the storage unit before an extreme voltage lowering of the power supply device caused by the cranking at the time of the engine startup occurs, and thus the data indicating the state of each unit of the vehicle at the time of the engine startup can be reliably held. In other words, the disappearing of data can be prevented.

In the control system according to one or more embodiments of the present invention, the data storage control unit may include a timing unit for instantly starting timing when the startup command signal is outputted from the central control unit to the drive control unit. In this case, when the startup start signal generated by the startup start device based on the operation of starting up the vehicle is inputted to the central control unit, the startup command signal is outputted from the central control unit to the drive control unit and the power supply device is controlled by the central control unit to supply power to each unit of the vehicle. The drive control unit drives the peripheral device to acquire the second data and stores the second data in the predetermined storage area in the storage unit based on the startup command signal inputted from the central control unit when receiving the power supply from the power supply device. The startup command signal is outputted from the central control unit to the startup control unit and the startup control unit operates the motor device based on the startup command signal when the timed time by the timing unit exceeds a predetermined time set in advance.

With such a configuration, the second data indicating the state of the peripheral device when the operation of starting up the vehicle is performed can be stored in the predetermined storage area in the storage unit before the startup control unit operates the motor device by having the predetermined time set in advance to a time sufficiently longer than the time necessary for storing the second data, whereby the data indicating the state of each unit of the vehicle can be reliably held without being influenced by the voltage lowering at the time of the engine startup. In other words, the disappearing of data can be prevented.

In the control system according to one or more embodiments of the present invention, when the startup start signal generated by the startup start device based on the operation of starting up the vehicle is inputted to the central control unit, the data storage control unit may output the startup command signal from the central control unit to the drive control unit and control the power supply device by the central control unit to supply power to each unit of the vehicle, the drive control unit driving the peripheral device to acquire the second data and storing the second data in the predetermined storage area in the storage unit based on the startup command signal inputted from the central control unit when receiving power supply from the power supply device, and then outputting a storage complete signal indicating that the storage of the second data is completed to the central control unit. In this case, the startup command signal is outputted from the central control unit to the startup control unit and the startup control unit operates the motor device based on the startup command signal when the storage complete signal is outputted.

With such a configuration, check is made that the second data is stored in the predetermined storage area in the storage unit with an output of the storage complete signal, and the central control unit outputs the startup command signal to the startup control unit, so that the second data indicating the state of the peripheral device when the operation of starting up the vehicle is performed can be stored in the predetermined storage area in the storage unit before the startup control unit operates the motor device. Thus, the data indicating the state of each unit of the vehicle can be reliably held without being influenced by the voltage lowering at the time of the engine startup, and the disappearing of data can be prevented.

In the control system according to one or more embodiments of the present invention, the drive control unit may further include a temporary storage unit for temporarily storing the second data. Moreover, the data storage control unit may store the second data in the temporary storage unit, and then store the second data stored in the temporary storage unit in the predetermined storage area in the storage unit.

With such a configuration, if difference between the first data and the second data is not found, the second data may not be stored in the predetermined storage area in the storage unit, whereby the number of storing (writing) to the predetermined storage area can be reduced, and the load regarding the storing process of the second data of the storage unit can be alleviated.

In the control system according to one or more embodiments of the present invention, the central control unit may verify a difference between the first data and the second data stored in the predetermined storage area in the storage unit, drive the peripheral device under control of the drive control unit when difference is found between the first data and the second data as a result of the verification, and change the state of the peripheral device to a state based on the first data.

With such a configuration, the state of the peripheral device does not need to be sequentially changed by the passenger and the like, whereby the trouble of the passenger can be saved and the convenience of the passenger can be enhanced.

In the control system according to one or more embodiments of the present invention, when the peripheral device is driven and the state of the peripheral device is changed to the state based on the first data, the setting information of the peripheral device set in advance may be applied in preference to the initial information of the peripheral device in the first data.

With such a configuration, the state of each peripheral device can be changed according to the setting information of the peripheral device set in advance for every passenger, whereby the convenience of the passenger can be enhanced different from the uniform change.

In the control system according to one or more embodiments of the present invention, the storage unit may be configured by a non-volatile storage medium.

With such a configuration, the first data can be held even if a predetermined power cannot be obtained from the power supply device.

In the control system according to one or more embodiments of the present invention, the temporary storage unit may be configured by a volatile storage medium.

With such a configuration, the second data disappears if a predetermined power is not obtained from the power supply device, and thus the process related to the erasing of the second data can be omitted.

According to one or more embodiments of the present invention, when the operation of starting up the vehicle is performed, the second data indicating the state of the peripheral device at the time of the operation is stored in the predetermined storage area in the storage unit before an extreme voltage lowering of the power supply device caused by the cranking at the time of the engine startup occurs, and thus the data indicating the state of each unit of the vehicle at the time of the engine startup can be reliably held, and the disappearing of data can be prevented.

DETAILED DESCRIPTION

Hereinafter, preferred embodiments of the present invention will be described with reference to FIGS. 1 to 4. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
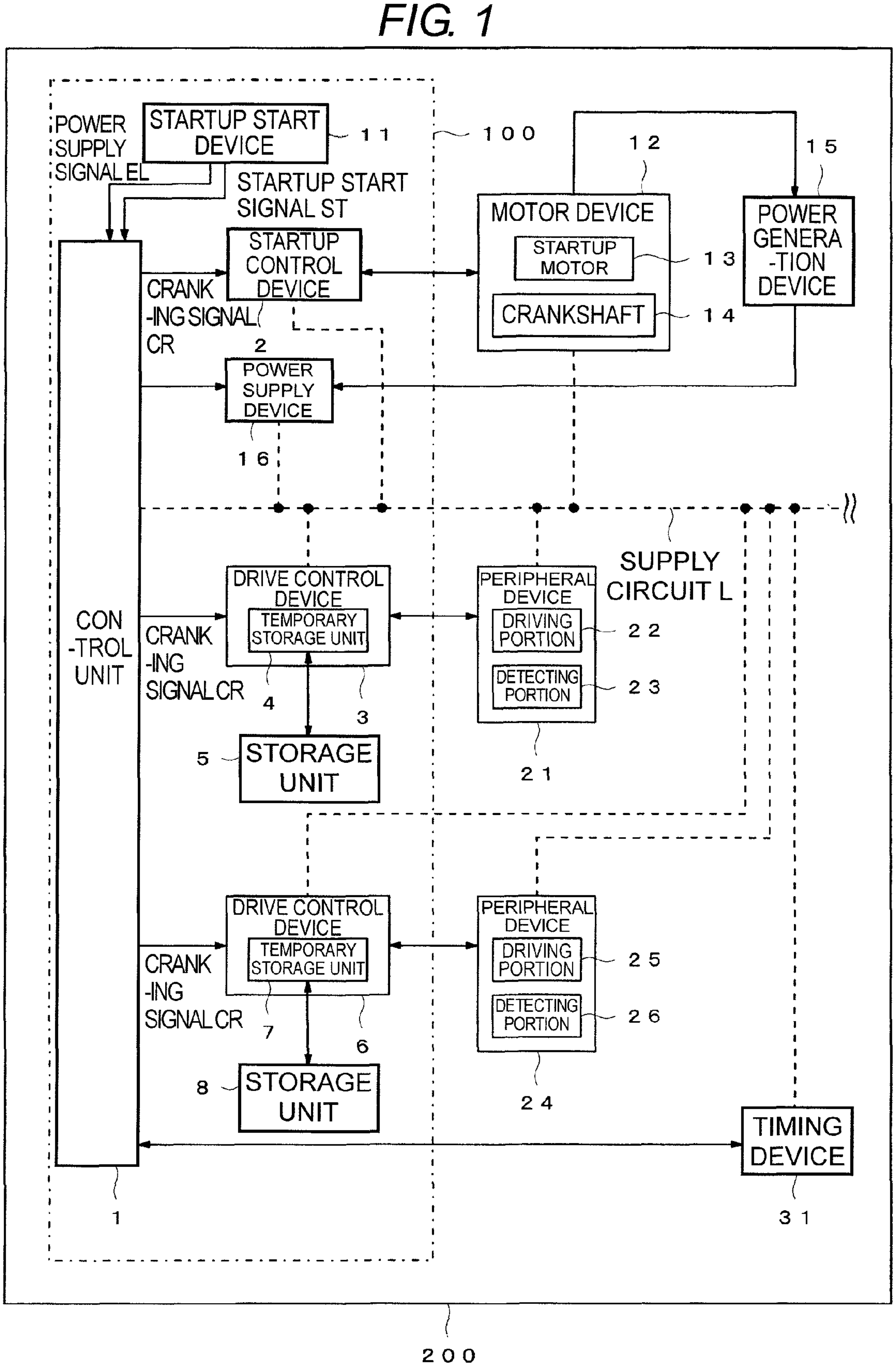
FIG. 1 is a block diagram showing a first example of a control system according to an embodiment of the present invention, and a vehicle mounted with the control system.

FIG. 1 is a block diagram showing a first example of a control system 100 according to an embodiment of the present invention, and a vehicle 200 mounted with the control system 100.

As shown in FIG. 1, the vehicle 200 includes the control system 100, a motor device 12, a power generating device 15, a power supply device 16, peripheral devices 21, 24, and a timing device 31.

Specifically, the motor device 12 includes an engine and drives the vehicle 200. The motor device 12 includes a startup motor 13 for startup, and a crankshaft 14 for converting power generated after the startup (e.g., power generated by reciprocating motion of a piston (not shown)) to a rotating force.

The power generating device 15 includes an alternator and the like, and generates power with the motor device 12 as a power source. The timing device 31 includes a clock, a timer, and the like, and times current time, elapsed time, and the like. The timing device 31 serves as one embodiment of a timing unit according to one or more embodiments of the present invention with a control unit 1 described below.

The peripheral devices 21, 24 are vehicle parts internally attached or externally attached to the vehicle 200, where in the present embodiment, the peripheral device 21 is a seat (not shown) on which a passenger who rides on the vehicle 200 sits, and the peripheral device 24 is a window (not shown) arranged on a door (not shown) for the passenger to get on and get off the vehicle 200.

The peripheral device 21 includes a drive portion 22 for changing the position of the seat in a horizontal direction and an inclination of the backrest of the seat, and a detecting portion 23 for detecting the position of the seat in the horizontal direction and the inclination of the backrest of the seat. The drive portion 22 includes a motor, and the detecting portion 23 includes a position sensor, an angle sensor, and the like.

The peripheral device 24 includes a drive portion 25 for opening and closing the window in an up and down direction (vertical direction), and a detecting portion 26 for detecting the position of the window in the up and down direction, the open/close speed of the window, and the like. The drive portion 25 includes a motor, and the detecting portion 26 includes a position sensor, a speed sensor, and the like.

The control system 100 surrounded with a chain dashed line in the figure is configured by a startup start device 11, the control unit 1, a startup control device 2, a power supply device 16, drive control devices 3, 6, and storage units 5, 8.

Herein, the control unit 1 is one embodiment of a central control unit in one or more embodiments of the present invention. The control unit 1 serves as one embodiment of a timing unit according to one or more embodiments of the present invention with the timing device 31 described above. The startup control device 2 serves as one embodiment of a startup control unit in one or more embodiments of the present invention, and the drive control device 3 serves as one embodiment of a drive control unit in one or more embodiments of the present invention.

Furthermore, the startup start device 11, the startup control device 2, the drive control devices 3, 6, temporary storage units 4, 7, and the storage units 5, 8 serve as one embodiment of a data storage control unit according to one or more embodiments of the present invention.

Specifically, the startup start device 11 includes a push-type engine switch, where the power supply with respect to each unit of the vehicle 200 is started or stopped by performing the power supply operation, or the startup of the vehicle 200 is started or stopped by performing the operation related to the startup of the vehicle 200 in the startup start device 11.

Note that the stop of the power supply to each unit of the vehicle 200 and the stop of the startup of the vehicle 200 are irrelevant to the present invention, and thus the description thereof will not be given below. An operation related to the start of the power supply with respect to each unit of the vehicle 200 is hereinafter referred to as "PS operation", and an operation related to the start of the startup of the vehicle 200 is hereinafter referred to as "ON operation". The details of each operation will be hereinafter described.

The control unit 1 includes a CPU (Central Processing Unit), a power supply ECU (Electronic Control Unit), and the like, and controls each unit of the vehicle 200. The startup control device 2 includes an engine ECU, and controls the startup of the motor device 12.

The power supply device 16 includes a battery, and accumulates power generated by the power generating device 15 and supplies power to each unit of the vehicle 200 through a supply circuit L shown with a broken line in the figure.

The drive control device 3 includes a seat ECU, and performs the drive control of the peripheral device 21. The drive control device 3 includes the temporary storage unit 4 including a volatile storage medium such as a RAM (Random Access Memory). The temporary storage unit 4 stores data (hereinafter referred to as "data A") indicating the state of the peripheral device 21 (e.g., position of seat, angle of backrest of the seat, and the like) upon the start of the power supply to each unit of the vehicle 200 and upon the start of the startup of the vehicle 200, that is, at the time of the PS operation and at the time of the ON operation of the startup start device 11.

The storage unit 5 includes a non-volatile storage medium such as an EEPROM (Erasable Programmable Read Only Memory), and stores data (hereinafter referred to as "data B") containing initial information of the peripheral device 21 and/or setting information (position of seat, angle of backrest, and the like suited to each passenger) set by the passenger and the like of each seat. The storage unit 5 is connected to the drive control device 3.

The drive control device 6 includes a window ECU, and performs the drive control of the peripheral device 24. The drive control device 6 includes the temporary storage unit 7 including a volatile storage medium such as a RAM. The temporary storage unit 7 stores data (hereinafter referred to as "data C") indicating the state of the peripheral device 24 (e.g., position of window in up and down direction (vertical direction), and the like) upon the start of the power supply to each unit of the vehicle 200 and upon the start of the startup of the vehicle 200, that is, at the time of the PS operation and at the time of the ON operation of the startup start device 11.

The storage unit 8 includes a non-volatile storage medium such as an EEPROM, and stores data (hereinafter referred to as "data D") containing initial information of the peripheral device 24 (fully-opened and fully-closed position of each window and the like). The storage unit 8 is connected to the drive control device 6.

The data B, D serve as one example of first data in one or more embodiments of the present invention, and the data A, C serve as one example of second data in one or more embodiments of the present invention.

As is well known in the art, the vehicle 200 includes various other peripheral devices (accelerator and brake, steering wheel, tire, and the like), but the illustration and the description thereof will not be given as they are irrelevant to the present invention.

Similarly, the control system 100 includes various control systems such as a SRS (Supplemental Restraint System), but the illustration and the description thereof will not be given as they are irrelevant to the present invention.

In the vehicle 200 having the above configuration, a power supply signal EL is outputted from the startup start device 11 to the control unit 1 when the PS operation (operation for starting power supply to each unit of the vehicle 200) is performed in the startup start device 11. A startup start signal ST is outputted from the startup start device 11 to the control unit 1 when the ON operation (operation of starting the startup of the vehicle 200) is performed in the startup start device 11.

The control unit 1 controls the power supply device 16 based on the inputted power supply signal EL or the startup start signal ST, so that power is supplied to each unit of the vehicle 200 through the supply circuit L from the power supply device 16. The control unit 1 outputs a cranking signal CR for rotating the crankshaft 14 arranged in the motor device 12 to the startup control device 2 and the drive control devices 3, 6 based on the startup start signal ST. The cranking signal CR serves as one example of a startup command signal in one or more embodiments of the present invention.

The startup control device 2 starts up the startup motor 13 of the motor device 12 based on the cranking signal CR inputted from the control unit 1, and rotates the crankshaft 14. In this manner, power is generated at the motor device 12 and the vehicle 200 is driven by the power.

When power is supplied through the supply circuit L from the power supply device 16, the drive control device 3 controls the peripheral device 21 to detect the state of the peripheral device 21 (seat position and backrest angle herein) at the time of the PS operation and at the time of the ON operation of the startup start device 11 with the detecting portion 23 of the peripheral device 21. The data A, which is the detection result of the detecting portion 23, is stored in the temporary storage unit 4 of the drive control device 3.

The drive control device 3 verifies whether or not there is a difference between the data A (detected value) stored in the temporary storage unit 4 and the data B (set value) stored in advance in the storage unit 5 connected to the drive control device 3.

If there is a difference between the data A and the data B as a result of the verification, the drive portion 22 of the peripheral device 21 is driven under the control of the drive control device 3, and the state of the peripheral device 21 is optimized based on the data B. As one example of optimization, the seat (peripheral device 21) moves to the position stored in the storage unit 5, and the backrest of the seat inclines to the angle stored in the storage unit 5. In this case, if the data B includes the initial information of the peripheral device 21 and the setting information set in advance by the passenger and the like, the setting information is applied in preference to the initial information. That is, the state of the peripheral device 21 is optimized based on the setting information.

Similar to the above, when power is supplied through the supply circuit L from the power supply device 16, the drive control device 6 controls the peripheral device 24 to detect the state of the peripheral device 24 (position in the up and down direction of the window herein) at the time of the PS operation and at the time of the ON operation of the startup start device 11 with the detecting portion 26 of the peripheral device 24. The data C, which is the detection result of the detecting portion 26, is stored in the temporary storage unit 7 of the drive control device 6.

The drive control device 6 verifies whether or not there is a difference between the data C (detected value) stored in the temporary storage unit 7 and the data D (set value) stored in advance in the storage unit 8 connected to the drive control device 6.

If there is a difference between the data C and the data D as a result of the verification, the drive portion 25 of the peripheral device 24 is driven under the control of the drive control device 6, and the state of the peripheral device 24 is optimized based on the data D. As one example of optimization, the window (peripheral device 24) moves to the fully-closed position stored in the storage unit 8. In this case, if the data D includes the initial information of the peripheral device 24 and the setting information set in advance by the passenger and the like, the setting information is applied in preference to the initial information. That is, the state of the peripheral device 24 is optimized based on the setting information.

As is well known in the art, since the power consumption in the motor device 12 becomes large at the time of cranking in the motor device 12, that is, upon the start of rotation of the crankshaft 14 by the startup motor 13, the supply voltage from the power supply device 16 to the motor device 12 rises. Accordingly, the supply voltage from the power supply device 16 to each ECU (startup control device 2, drive control devices 3, 6) sometimes temporarily (e.g., time of 1/1000 second) lowers.

The ECU becomes inoperable when the voltage value of the power supply device 16 becomes a voltage value lower than a minimum voltage necessary for the operation of each ECU (startup control device 2, drive control devices 3, 6) due to voltage lowering. In particular, since the incorporating temporary storage units 4, 7 are configured by a volatile storage medium in the drive control devices 3, 6 of such ECU, the data A, C being stored or stored in the temporary storage units 4, 7, respectively disappear due to lack of power.

Therefore, the relevant data is held in the related art by restoring the data stored in the volatile storage medium in the non-volatile storage medium, that is, restoring the data A, C stored in the temporary storage units 4, 7 according to the present embodiment in the storage units 5, 8, but the relevant data may not be moved in a complete state if voltage lowering occurs when moving the data.

Furthermore, since the ON operation of the startup start device 11 cannot be performed during the PS operation of the startup start device 11, that is, from the state where only the power supply is performed to each unit of the vehicle 200, the operation needs to be performed to once stop the power supply. The data A, C stored in the temporary storage units 4, 7, respectively, disappear after the PS operation of the startup start device 11.

Therefore, a predetermined control operation, described below, is performed in the control system 100 shown in FIG. 1 to hold the data A, C at the time of the ON operation of the startup start device 11, that is, to prevent disappearing of the data A, C. The control operation will be described using a flowchart shown in FIG. 2.

Figure 2:
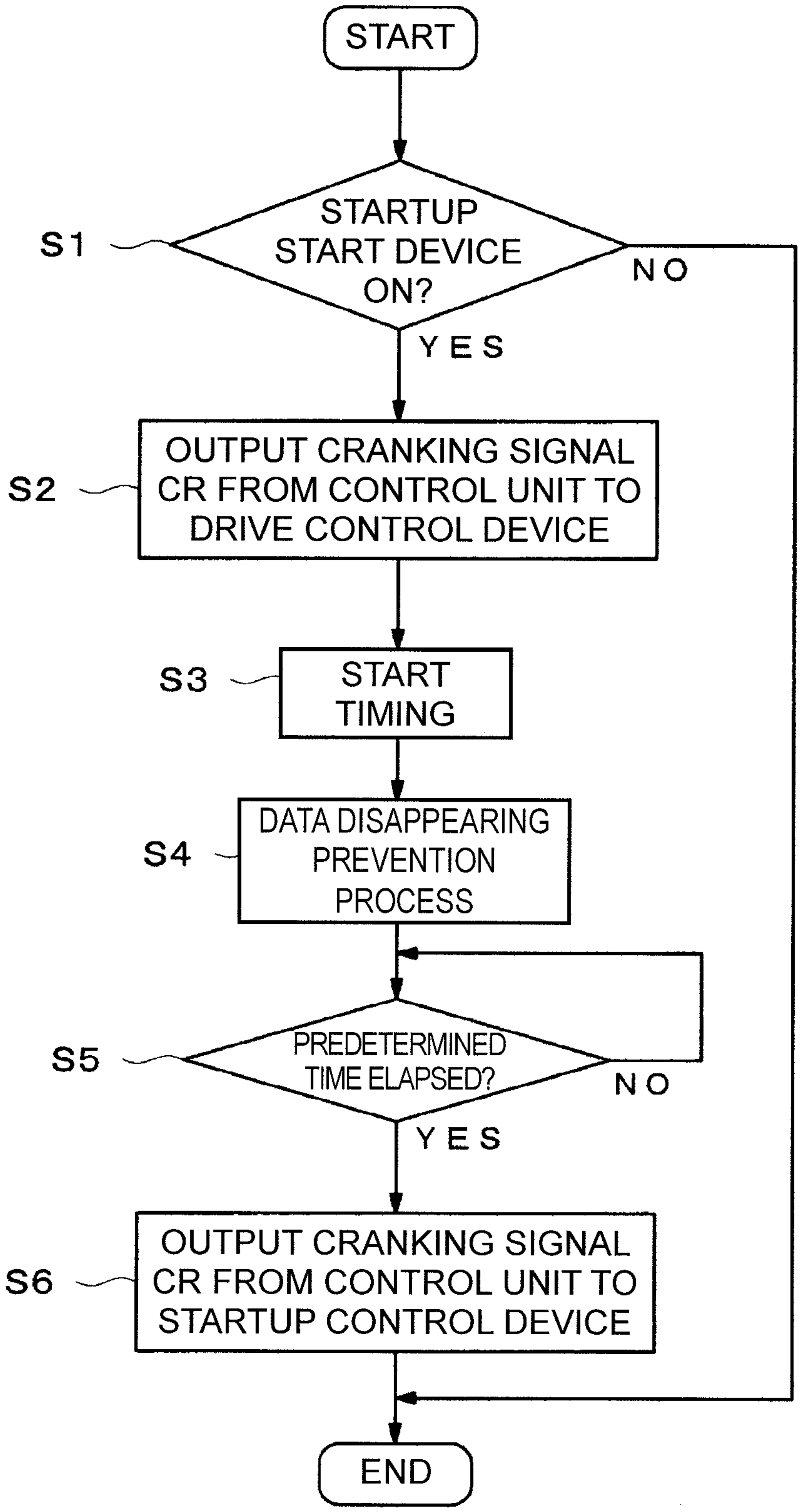
FIG. 2 is a flowchart showing a control operation by the control system of the first example.

In step S1 of the flowchart shown in FIG. 2, the process proceeds to step S2 if the ON operation (operation of starting up the vehicle 200) is performed in the startup start device 11 (step S1: YES), and the flowchart is terminated for the next time if the ON operation is not performed in the startup start device 11 (step S1: NO).

In step S2, the startup start signal ST is outputted to the control unit 1 from the startup start device 11 in which the ON operation is performed in step S1, and the control unit 1 outputs the cranking signal CR only to the drive control devices 3, 6 based on the startup start signal ST. The control unit 1 controls the power supply device 16 based on the inputted startup start signal ST, so that the power is supplied to each unit of the vehicle 200 through the supply circuit L from the power supply device 16.

The timing by the timing device 31 starts under the control of the control unit 1 in step S3, and the data storing control process with respect to the data A, C starts in step S4.

Specifically, in step S4, the drive control devices 3, 6 first start the control of the peripheral device 21 (seat) and the peripheral device 24 (window) based on the start of the power supply in step S2.

Thereafter, the peripheral devices 21, 24 detect the state of the peripheral devices 21, 24 at the time of the ON operation of the startup start device 11 with the respective detecting portions 23, 26 under the control of each drive control device 3, 6. The data A, C, which are the detection results of the detecting portions 23, 26, are stored in the respective temporary storage units 4, 7 of the drive control devices 3, 6 under the control of the drive control devices 3, 6.

The drive control devices 3, 6 store the data A, C stored in the temporary storage units 4, 7 to predetermined storage areas in the storage units 5, 8 respectively connected to the drive control devices 3, 6 based on the cranking signal CR outputted from the control unit 1 in step S2.

In this case, the data A, C stored in the temporary storage units 4, 7 may be copied and the copied data A, C may be stored in the predetermined storage areas of the storage units 5, 8. The data A, C may be moved to the predetermined storage areas of the storage units 5, 8 from the temporary storage units 4, 7 and stored therein. Furthermore, when verifying whether or not there is a difference between the data A and the data B, and between the data C and the data D by the drive control devices 3, 6, the verification is carried out after the data A, C are stored in the predetermined storage areas of the storage units 5, 8.

In step S5, whether or not the timed time by the timing device 31 exceeds a predetermined time set in advance is verified by the control unit 1, where the process proceeds to step S6 if exceeding the predetermined time (step S5: YES) as a result of the verification, and the process returns to immediately before step S5 to again perform the verification if not exceeding the predetermined time (step S5: NO).

The average required time of the data storing control process performed in step S4 is calculated by preliminary verification, and the above-mentioned predetermined time is a time sufficiently longer than the average required time of the data storing control process in the present example.

In step S6, the control unit 1 outputs the cranking signal CR to the startup control device 2 in response to the result of step S5, so that the motor device 12 operates under the control of the startup control device 2 based on the cranking signal CR, and the present flowchart is terminated.

Therefore, in the first example described above, when the ON operation is performed in the startup start device 11, the startup start signal ST is outputted from the startup start device 11, and the control unit 1 first outputs the cranking signal CR only to the drive control devices 3, 6 and controls the power supply device 16 to supply power to each unit of the vehicle 200 through the supply circuit L from the power supply device 16 based on the startup start signal ST. The timing by the timing device 31 also starts. Each drive control device 3, 6 starts the control of the peripheral device 21, 24 by the power supply from the power supply device 16, and detects the state of the peripheral device 21, 24 at the time of the ON operation of the startup start device 11 with the detecting portion 23, 26 of each peripheral device. The data A, C, which are detection results, are stored in the temporary storage units 4, 7 of the drive control devices 3, 6, respectively. The drive control devices 3, 6 store the data A, C stored in the temporary storage units 4, 7 in the predetermined storage areas of the storage units 5, 8 connected to the drive control devices 3, 6 based on the cranking signal CR outputted from the control unit 1. In this case, the old data of the data A, C stored in the predetermined storage areas of the storage units 5, 8 are updated by new data. The control unit 1 outputs the cranking signal CR to the startup control device 2 when the timed time by the timing device 31 exceeds the predetermined time set in advance.

As described above, since the predetermined time in step S5 is a time sufficiently longer than the average required time of the data storing control process in step S4 in the present example, the data A, C stored in the temporary storage units 4, 7 including a volatile storage medium can be stored in the storage units 5, 8 including a non-volatile storage medium before the motor device 12 is driven by the startup control device 2 in step S6. Thus, the data A, C indicating the state of the peripheral devices 21, 24 are prevented from disappearing due to lowering in voltage of the ECU at the time of the ON operation of the startup start device 11. In this manner, an accurate control operation based on the data A, C (detection value) and the data B, D (set value) can be performed.

Figure 3:
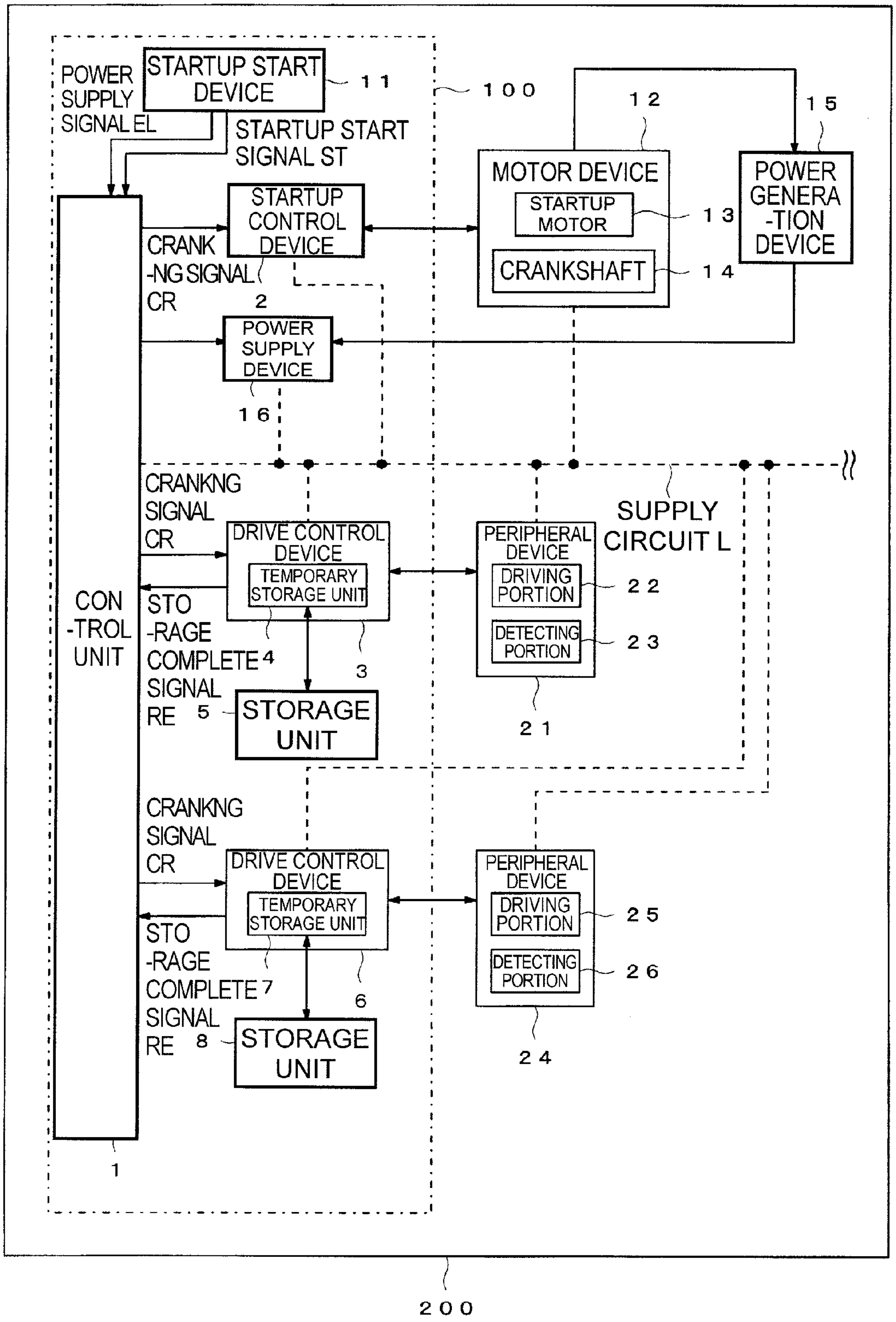
FIG. 3 is a block diagram showing a second example of a control system according to an embodiment of the present invention, and a vehicle mounted with the control system.

FIG. 3 is a block diagram showing a second example of the control system 100 according to an embodiment of the present invention, and the vehicle 200 mounted with the control system 100. In FIG. 3, same reference numerals are denoted for the same portions or the corresponding portions as FIG. 1.

In FIG. 3, the timing device 31 in FIG. 1 is not arranged. A storage complete signal RE, described below, is outputted from the drive control devices 3, 6 to the control unit 1. Other configurations are the same as FIG. 1.

Figure 4:
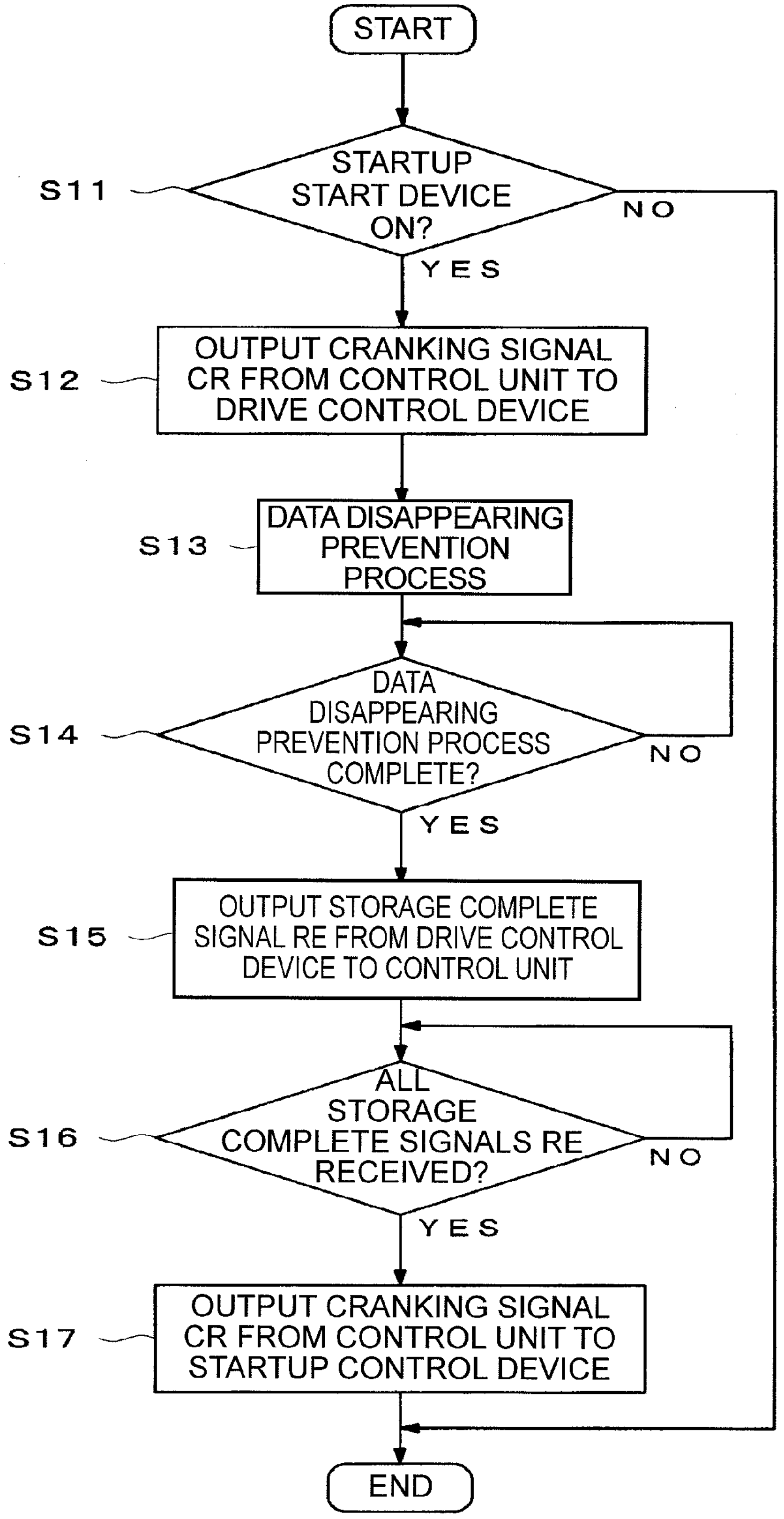
FIG. 4 is a flowchart showing a control operation by the control system of the second example.

FIG. 4 is a flowchart showing the control operation by the control system 100 shown in FIG. 3.

In step S11 of the flowchart shown in FIG. 4, the process proceeds to step S12 if the ON operation is performed in the startup start device 11 (step S11: YES), and the flowchart is terminated for the next time if not the ON operation is not performed in the startup start device 11 (step S11: NO).

In step S12, the startup start signal ST is outputted to the control unit 1 from the startup start device 11 in which the ON operation is performed in step S11, and the control unit 1 outputs the cranking signal CR only to the drive control devices 3, 6 based on the startup start signal ST. The control unit 1 controls the power supply device 16 based on the inputted startup start signal ST, so that the power is supplied to each unit of the vehicle 200 through the supply circuit L from the power supply device 16.

In step S13, the data storing control process with respect to the above-described data A, C starts.

Specifically, in step S13, the drive control devices 3, 6 first start the control of the peripheral devices 21, 24 based on the start of the power supply in step S12.

Thereafter, the peripheral devices 21, 24 detect the state of the peripheral devices 21, 24 at the time of the ON operation of the startup start device 11 with the respective detecting portions 23, 26 under the control of each drive control device 3, 6. The data A, C, which are the detection results of the detecting portions 23, 26, are stored in the respective temporary storage units 4, 7 of the drive control devices 3, 6 under the control of the drive control devices 3, 6.

The drive control devices 3, 6 store the data A, C stored in the temporary storage units 4, 7 to predetermined storage areas in the storage units 5, 8 respectively connected to the drive control devices 3, 6 based on the cranking signal CR outputted from the control unit 1 in step S2.

In this case, the data A, C stored in the temporary storage units 4, 7 may be copied and the copied data A, C may be stored in the predetermined storage areas of the storage units 5, 8. The data A, C may be moved to the predetermined storage areas of the storage units 5, 8 from the temporary storage units 4, 7 and stored therein. Furthermore, when verifying whether or not there is a difference between the data A and the data B, and between the data C and the data D by the drive control devices 3, 6, the verification is carried out after the data A, C are stored in the predetermined storage areas of the storage units 5, 8.

In step S14, whether or not the data storing control process in step S13 is terminated is verified, where the process proceeds to step S15 if the data storing control process is terminated (step S14: YES) as a result of the verification, and the process returns to immediately before step S14 to again perform the verification if the data storing control process is not terminated (step S14: NO).

Specifically, whether or not the data A, C are stored in the predetermined storage areas of the storage units 5, 8 is verified by the drive control devices 3, 6.

In step S15, the storage complete signal RE is generated in each drive control device 3, 6 in response to the verification result in step S14, which storage complete signal RE is outputted to the control unit 1.

In step S16, whether or not the storage complete signal RE outputted from each drive control device 3, 6 are all inputted to the control unit 1, that is, whether or not the control unit 1 received all storage complete signals RE is verified by the control unit 1. As a result of the verification, the process proceeds to step S17 if all the storage complete signals RE are received (step S16: YES), and the process returns to immediately before step S16 to again perform the verification if all the storage complete signals RE are not received (step S16: NO).

In step S17, the control unit 1 outputs the cranking signal CR to the startup control device 2 in response to the verification result in step S16, whereby the motor device 12 operates under the control of the startup control device 2 based on the cranking signal CR, and the present flowchart is terminated.

Therefore, in the second example described above, when the ON operation is performed in the startup start device 11, the startup start signal ST is outputted from the startup start device 11, and the control unit 1 first outputs the cranking signal CR only to the drive control devices 3, 6 and controls the power supply device 16 to supply power to each unit of the vehicle 200 through the supply circuit L from the power supply device 16 based on the startup start signal ST. Each drive control device 3, 6 starts the control of the peripheral device 21, 24 by the power supply from the power supply device 16, and detects the state of the peripheral device 21, 24 at the time of the ON operation of the startup start device 11 with the detecting portion 23, 26 of each peripheral device. The data A, C, which are detection results, are stored in the temporary storage units 4, 7 of the drive control devices 3, 6, respectively. The drive control devices 3, 6 store the data A, C stored in the temporary storage units 4, 7 in the predetermined storage areas of the storage units 5, 8 connected to the drive control devices 3, 6 based on the cranking signal CR outputted from the control unit 1. In this case, the old data of the data A, C stored in the predetermined storage areas of the storage units 5, 8 are updated by new data. The storage complete signal RE is outputted from each drive control device 3, 6 to the control unit 1 when the data A, C are stored in the predetermined storage areas of the storage units 5, 8, and the control unit 1 outputs the cranking signal CR to the startup control device 2 based on the storage complete signal RE.

Therefore, since the data A, C stored in the temporary storage units 4, 7 including a volatile storage medium can be stored in the storage units 5, 8 including a non-volatile storage medium before the motor device 12 is driven by the startup control device 2, the data A, C indicating the state of the peripheral devices 21, 24 are prevented from disappearing due to lowering in voltage of the ECU at the time of the ON operation of the startup start device 11. Furthermore, since the control unit 1 outputs the cranking signal CR to the startup control device 2 after checking that the data A, C are stored in the predetermined storage areas of the storage units 5, 8 with the storage complete signal RE, the disappearing of the data A, C can be more reliably prevented. In this manner, an accurate control operation based on the data A, C (detection value) and the data B, D (set value) thus can be performed.

In the present invention, various embodiments other than the above can be adopted. For instance, in the above-described embodiment, the data A, C are stored in the predetermined storage areas of the storage units 5, 8 after being stored in the temporary storage units 4, 7 under the control of the drive controls devices 3, 6 in step S4 of the first example and step S13 of the second example, but the present invention is not limited thereto, and the data A, C may not be stored in the predetermined storage areas of the storage unit 5, 8 if there is no difference between the data A and the data B, and between the data C and the data D as a result of the verification by each drive control device 3, 6.

In the above embodiment, the data A, C stored in the predetermined storage areas of the storage units 5, 8 remain stored in the predetermined storage areas even after the lowering of voltage of the power supply device 16 that occurred from the start of cranking in the motor device 12, but the present invention is not limited thereto, and the control unit 1 may generate a signal indicating the end of voltage lowering, and output the voltage lowering end signal to the drive control devices 3, 6. The drive control devices 3, 6 then may verify whether or not there is difference between the data A stored in the predetermined storage area of the storage unit 5 and the data B, and between the data C stored in the predetermined storage area in the storage unit 8 and the data D, and erase the data A, C from the predetermined storage areas in the storage units 5, 8 if there is no difference as a result of such verification.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A control system comprising:

a startup start device that generates and outputs a startup start signal that starts a startup of a vehicle based on an operation of starting up the vehicle;

a power supply device that supplies power to each unit of the vehicle;

a central control unit that generates and outputs to a motor device for driving the vehicle, a startup command signal that starts up the motor device based on the startup start signal;

a startup control unit that performs a startup control of the motor device based on the startup command signal;

a drive control unit that performs a drive control of a peripheral device configuring the vehicle; and a storage unit that stores first data containing initial information of the peripheral device or setting information set in advance;

the control system further comprising:

a data storage control unit that performs the startup control of the motor device by the startup control unit after storing second data indicating, when the operation of starting up the vehicle is performed, a state of the peripheral device at the time of the operation in a predetermined storage area in the storage unit.

2. The control system according to claim 1, wherein the data storage control unit comprises a timing unit that instantly starts timing when the startup command signal is outputted from the central control unit to the drive control unit; and when the startup start signal generated by the startup start device based on the operation of starting up the vehicle is inputted to the central control unit, the startup command signal is outputted from the central control unit to the drive control unit and the power supply device is controlled by the central control unit to supply power to each unit of the vehicle, the drive control unit driving the peripheral device to acquire the second data and storing the second data in the predetermined storage area in the storage unit based on the startup command signal inputted from the central control unit when receiving the power supply from the power supply device, and the startup command signal being outputted from the central control unit to the startup control unit and the startup control unit operating the motor device based on the startup command signal when the timed time by the timing unit exceeds a predetermined time set in advance.

3. The control system according to claim 1, wherein when the startup start signal generated by the startup start device based on the operation of starting up the vehicle is inputted to the central control unit, the data storage control unit outputs the startup command signal from the central control unit to the drive control unit and controls the power supply device by the central control unit to supply power to each unit of the vehicle, the drive control unit driving the peripheral device to acquire the second data and storing the second data in the predetermined storage area in the storage unit based on the startup command signal inputted from the central control unit when receiving power supply from the power supply device, and then outputting a storage complete signal indicating that the storage of the second data is completed to the central control unit, the startup command signal being outputted from the central control unit to the startup control unit and the startup control unit operating the motor device based on the startup command signal when the storage complete signal is outputted.

4. The control system according to claim 1, wherein
the drive control unit further comprises a temporary storage unit that temporarily stores the second data; and
the data storage control unit stores the second data in the temporary storage unit, and then stores the second data stored in the temporary storage unit in the predetermined storage area in the storage unit.

5. The control system according to claim 1, wherein
the central control unit verifies a difference between the first data and the second data stored in the predetermined storage area in the storage unit, drives the peripheral device under control of the drive control unit when difference is found between the first data and the second data as a result of the verification, and changes the state of the peripheral device to a state based on the first data.

6. The control system according to claim 5, wherein when the peripheral device is driven and the state of the peripheral device is changed to the state based on the first data, the setting information of the peripheral device set in advance is applied in preference to the initial information of the peripheral device in the first data.

7. The control system according to claim 1, wherein the storage unit is configured by a non-volatile storage medium.

8. The control system according to claim 4, wherein the temporary storage unit is configured by a volatile storage medium.

9. The control system according to claim 2, wherein
the drive control unit further comprises a temporary storage unit that temporarily stores the second data; and
the data storage control unit stores the second data in the temporary storage unit, and then stores the second data stored in the temporary storage unit in the predetermined storage area in the storage unit.

10. The control system according to claim 3, wherein
the drive control unit further comprises a temporary storage unit that temporarily stores the second data; and
the data storage control unit stores the second data in the temporary storage unit, and then stores the second data stored in the temporary storage unit in the predetermined storage area in the storage unit.

11. The control system according to claim 2, wherein
the central control unit verifies a difference between the first data and the second data stored in the predetermined storage area in the storage unit, drives the peripheral device under control of the drive control unit when difference is found between the first data and the second data as a result of the verification, and changes the state of the peripheral device to a state based on the first data.

12. The control system according to claim 3, wherein
the central control unit verifies a difference between the first data and the second data stored in the predetermined storage area in the storage unit, drives the peripheral device under control of the drive control unit when difference is found between the first data and the second data as a result of the verification, and changes the state of the peripheral device to a state based on the first data.

13. The control system according to claim 4, wherein
the central control unit verifies a difference between the first data and the second data stored in the predetermined storage area in the storage unit, drives the peripheral device under control of the drive control unit when difference is found between the first data and the second data as a result of the verification, and changes the state of the peripheral device to a state based on the first data.

14. The control system according to claim 9, wherein
the central control unit verifies a difference between the first data and the second data stored in the predetermined storage area in the storage unit, drives the peripheral device under control of the drive control unit when difference is found between the first data and the second data as a result of the verification, and changes the state of the peripheral device to a state based on the first data.

15. The control system according to claim 10, wherein
the central control unit verifies a difference between the first data and the second data stored in the predetermined storage area in the storage unit, drives the peripheral device under control of the drive control unit when difference is found between the first data and the second data as a result of the verification, and changes the state of the peripheral device to a state based on the first data.

16. The control system according to claim 11, wherein when the peripheral device is driven and the state of the peripheral device is changed to the state based on the first data, the setting information of the peripheral device set in advance is applied in preference to the initial information of the peripheral device in the first data.

17. The control system according to claim 12, wherein when the peripheral device is driven and the state of the peripheral device is changed to the state based on the first data, the setting information of the peripheral device set in advance is applied in preference to the initial information of the peripheral device in the first data.

18. The control system according to claim 13, wherein when the peripheral device is driven and the state of the peripheral device is changed to the state based on the first data, the setting information of the peripheral device set in advance is applied in preference to the initial information of the peripheral device in the first data.

19. The control system according to claim 14, wherein when the peripheral device is driven and the state of the peripheral device is changed to the state based on the first data, the setting information of the peripheral device set in advance is applied in preference to the initial information of the peripheral device in the first data.

20. The control system according to claim 15, wherein when the peripheral device is driven and the state of the peripheral device is changed to the state based on the first data, the setting information of the peripheral device set in advance is applied in preference to the initial information of the peripheral device in the first data.

* * * * *